(12) United States Patent
Reble

(10) Patent No.: US 9,500,462 B2
(45) Date of Patent: *Nov. 22, 2016

(54) BRAKE LINING GAUGE MEASUREMENT TOOLS

(71) Applicant: Lisle Corporation, Clarinda, IA (US)

(72) Inventor: Mark Reble, Lubbock, TX (US)

(73) Assignee: Lisle Corporation, Clarinda, IA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/625,839

(22) Filed: Feb. 19, 2015

(65) Prior Publication Data

US 2016/0084627 A1    Mar. 24, 2016

Related U.S. Application Data

(63) Continuation-in-part of application No. 14/493,258, filed on Sep. 22, 2014.

(51) Int. Cl.
*G01B 5/00* (2006.01)
*G01B 3/30* (2006.01)

(52) U.S. Cl.
CPC .............. *G01B 5/0028* (2013.01); *G01B 3/30* (2013.01)

(58) Field of Classification Search
CPC ......... G01B 5/00; G01B 5/0028; G01B 5/06
USPC .................................... 33/600, 609
See application file for complete search history.

(56) References Cited

U.S. PATENT DOCUMENTS

| | | | |
|---|---|---|---|
| 552,238 A | 12/1895 | Darling | |
| 867,011 A | 9/1907 | Bromley | |
| 4,283,858 A | 8/1981 | Sobczak | |
| D319,404 S | 8/1991 | Jackson, Sr. | |
| 6,237,723 B1 | 5/2001 | Salsman | |
| 6,279,241 B1 | 8/2001 | Chen | |
| 6,813,842 B2 | 11/2004 | Wang | |
| 6,931,744 B1 | 8/2005 | Ikerd, Jr. et al. | |
| 7,040,151 B2 * | 5/2006 | Graham | G01B 5/0028 33/600 |
| 7,607,237 B2 | 10/2009 | Schafer | |
| 7,845,091 B2 | 12/2010 | Clark | |
| D754,007 S * | 4/2016 | Stefancic, Sr. | D10/65 |
| 2004/0200084 A1 | 10/2004 | Wang | |
| 2005/0274175 A1 | 12/2005 | Graham et al. | |
| 2013/0185950 A1 | 7/2013 | Oode et al. | |
| 2015/0082646 A1 | 3/2015 | Palynchuk et al. | |
| 2016/0084626 A1 | 3/2016 | Reble | |
| 2016/0084627 A1 * | 3/2016 | Reble | G01B 5/0028 33/609 |

OTHER PUBLICATIONS

Mar. 30, 2016 (US) Non-Final Office Action—U.S. Appl. No. 14/493,258.

(Continued)

*Primary Examiner* — Yaritza Guadalupe-McCall
(74) *Attorney, Agent, or Firm* — Banner & Witcoff, Ltd.

(57) ABSTRACT

A brake pad lining thickness measurement gauge tool includes a grip handle end with a projecting probe having two substantially dimensionally identical measurement surfaces at a measurement or terminal opposite end of the gauge tool, one surface extending axially from the grip handle end and the other interesting surface extending transversely to the axial surface. A set of the gauge tools includes distinctively dimensioned terminal measurement ends.

7 Claims, 3 Drawing Sheets

(56) References Cited

OTHER PUBLICATIONS

KD Tools KDT3962 Brake Lining Thickness Gauge, retrieved on Feb. 17, 2015, retrieved from the internet: <http://www.amazon.com/Tools-KDT3962-Brake-Lining-Thicknes/dp/B002S54U31>.

KD Tools KDT-2116D Disc Brake Lining Wear Gauge, retrieved on Feb. 17, 2015, retrieved from the internet: <http://www.mytoolsforyou.com/automotive-tools/KDT-2116D.html>.

OTC 6596 Brake Pad Gauges, retrieved on Jul. 15, 2014, retrieved from the internet: <http://www.zoro.com/g/00120017/k-G4477356?utm_source=google_shopping&utm_medi . . . >.

R.J.P., Invention Disclosure Agreement dated Apr. 15, 1993, Brake lining thickness for tractor and trailer air brakes.

Chris Bieniek, Invention Disclosure Agreement No. 00-383 dated Sep. 6, 2000, Brake lining thickness gauge.

Bill Bremer, Invention Disclosure Agreement No. 03-158 dated Mar. 24, 2003, Measuring brake shoes with riveted lining.

Patrick Malloy, Invention Disclosure Agreement No. 04-240 dated Jun. 21, 2004, Disc brake pad thickness.

Keith D. Lucente, Idea Disclosure Agreement No. 08-132 dated Mar. 6, 2008, Portable brake pad measuring tool.

Maurice K. Wiggs, Idea Disclosure Agreement No. 09-400 dated Oct. 20, 2009, Brake pad wear gauge.

James Sazani, Idea Disclosure Agreement No. 11-015 dated Jan. 7, 2011, Measuring brake rotors without disassembly of the brakes.

Tony Amaral, Idea Disclosure Agreement No. 11-019 dated Jan. 5, 2011, Getting a more accurate measurement of remaining brake pad material without dismantling the wheel assembly.

Lloyd E. Nelson, Idea Disclosure Agreement No. 11-441 dated Oct. 25, 2011, Checking brake pad thickness without taking the wheels off most cars and trucks.

Osama Mostafa, Idea Disclosure Agreement No. 12-327 dated Oct. 8, 2012, Brake pad thickness measure.

Robert Davis, Idea Disclosure Agreement No. 13-049 dated Feb. 3, 2013, Brake pad wear gauge.

Preston Scott Weber, Idea Disclosure Agreement No. 13-062 dated Feb. 15, 2013, Brake pad measurement tool.

Jim Trook, Idea Disclosure Agreement No. 13-072 dated Feb. 28, 2013, Brake pad measuring tool.

* cited by examiner

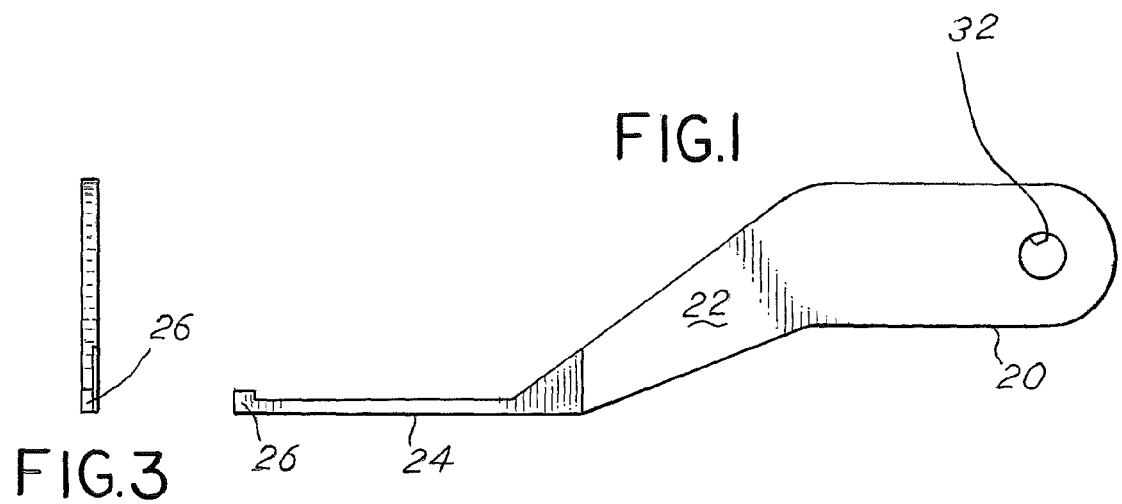
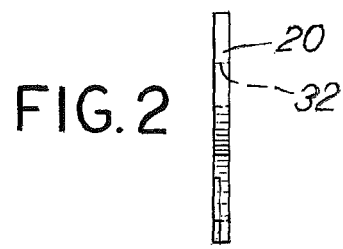
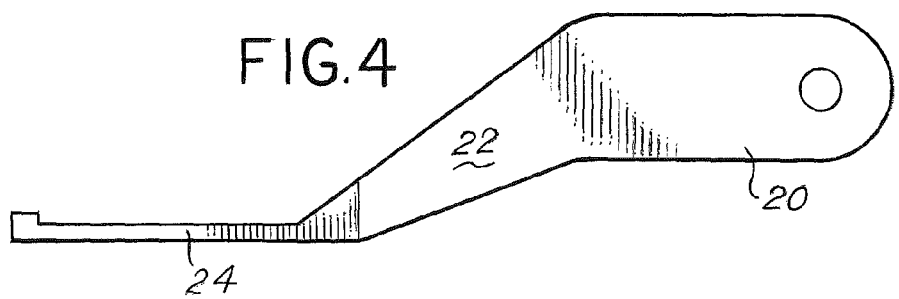

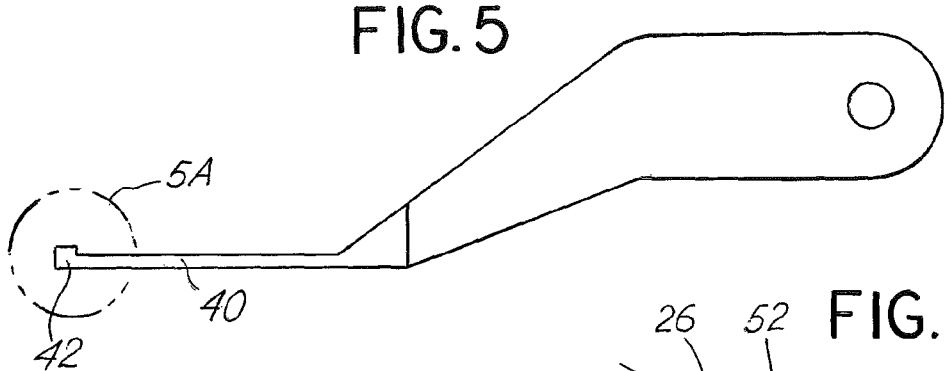
FIG. 5
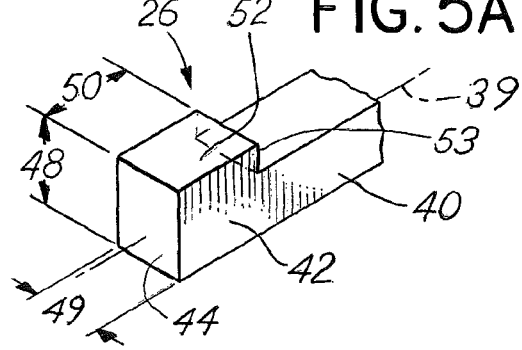
FIG. 5A
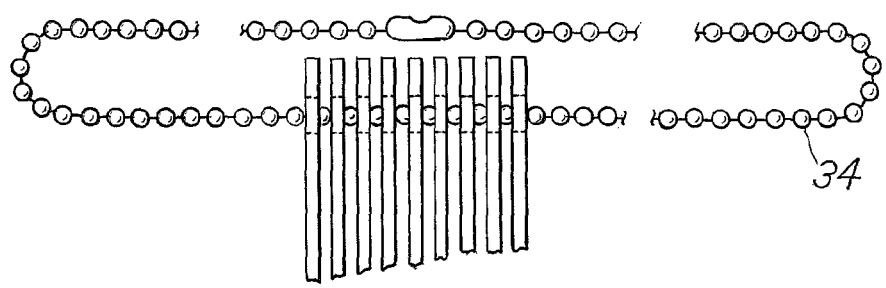
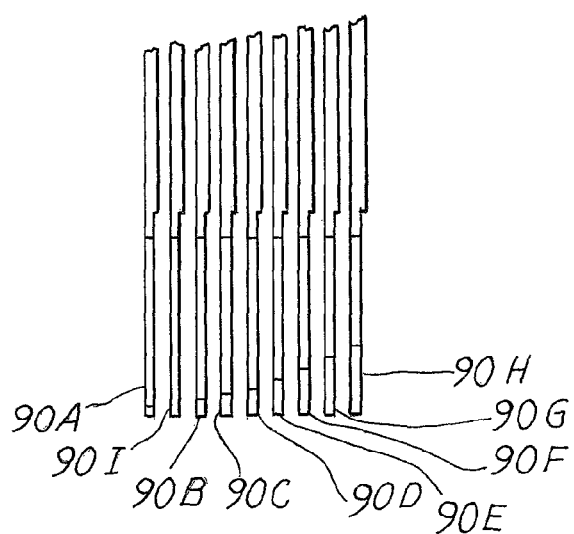
FIG. 6

BRAKE LINING GAUGE MEASUREMENT TOOLS

CROSS REFERENCE TO RELATED APPLICATION

This is a continuation-in-part application claiming priority to and incorporating by reference U.S. application Ser. No. 14/493,258, filed Sep. 15, 2014 entitled "Brake Pad Measuring Gauge" which is a non-provisional application claiming priority to Ser. No. 61/765,020 filed Feb. 14, 2013 entitled "Brake Pad Measuring Gauge".

BACKGROUND OF THE INVENTION

In a principal aspect, the present invention relates to a set of gauges for measurement of the thickness of a brake pad lining mounted to a caliper in a disc brake assembly.

Often a mechanic needs to determine the amount of wear of a disc brake pad on a caliper mount of a disc brake assembly. Because the pad attached to the caliper is subjected to repeated braking events, the brake pad lining becomes worn. Often, in order to evaluate the extent of wear, it is necessary to remove the wheel of the vehicle to secure access to the brake assembly and effectively measure the thickness of the brake pad lining. This is a time consuming and sometimes expensive undertaking. Nonetheless, in order to promote safety and evaluate whether a pad requires replacement, such activity is required. Moreover, during general inspections of vehicles, many automobile repair shops have a checklist which requires such inspection and evaluation subsequent to certain mileage events.

In an effort to avoid disassembly of or removal of a wheel assembly from a vehicle, various proposals have been suggested for tools or gauges which will enable inspection of the wear of a disc brake pad lining. U.S. Pat. No. 6,931,744 entitled "Portable Brake Pad Measuring Tool" granted Aug. 23, 2005 discloses such a tool. Another example of gauges for measuring the wear of a brake pad is disclosed in U.S. Pat. No. 7,845,091 entitled "Brake Pad Measuring Tool and Method of Using Same". Additionally, tools of this general nature are available from various sources and identified as Brake Lining Thickness Gauge, Product Code KDT 3962; and Disc Brake Lining Wear Gauge with Fractional Scale, KD-2116D offered by KD Tools, for example.

Despite these various approaches, there remains the difficulty and necessity on many occasions to remove the entire wheel assembly (wheel and tire) in order to achieve access to the disc brake assembly. If that effort can be avoided, a great deal of time and effort can be saved. Thus, there has remained the need for a tool or set of tools which can be effectively used for measurement of the thickness of disc brake pad lining without necessarily removing the wheel assembly associated with the vehicle.

SUMMARY OF THE INVENTION

Briefly, the present invention comprises a tool for measurement of the thickness of a brake pad lining of a disc brake assembly in situ, or in other words, without necessarily removing the wheel assembly of the vehicle. The tool comprises an elongate plate with a manual grip handle section at one end and a gauge measurement section at the opposite end. The sections are longitudinally spaced from one another and the gauge measurement section is joined to the grip handle section by a probe extension having a longitudinal axis. The gauge measurement section is thus positioned at the distal end of the tool generally opposite the grip handle section.

The gauge may comprise a block, such as a generally rectangular quadrilateral block, for example a cube, having at least two sides of generally identical dimension. One of those sides is generally parallel to the longitudinal axis and the other is generally transverse to the longitudinal axis. Because the two dimensions are equal, the tool may be positioned with the one side dimension extending through the spokes or hub of a wheel parallel to the disc brake axis to determine if it matches the space occupied by the brake pad lining thickness between the brake rotor and the pad backing plate. If the gauge is appropriately sized it can thereby conform to and confirm the thickness of the pad lining.

Alternatively, the probe may be fitted in a radial direction transverse to the axis of the disc brake assembly to interpose the transverse outer end side dimension of the block between the disc and the pad backing plate to conform and confirm pad lining thickness. The same dimension associated with the respective measurement parts of the gauge enable the gauge to be used either transversely to the rotational axis of the disc or rotor or parallel to the rotational axis of the disc or rotor.

A set of such tools, each having its own unique pair of equal measurement dimensions provides a mechanic with a means to interpose the gauge measurement sections and match the dimension of the gauge measurement sections with the thickness of the brake pad lining by trial and error.

An embodiment of the invention incorporates a rectangular parallelepiped as the gauge measurement section mounted to a probe extension. The two equal dimension sides of the gauge measurement section include one side generally parallel with the longitudinal axis of the extension probe and a side transverse to the axis.

An embodiment of the invention incorporates a cube shape gauge measurement section mounted at the end of the probe extension. The probe extension has a cross sectional dimension less than the side dimensions of the block to define a lip between the block and the probe section. The lip facilitates placement of the gauge measurement section with the probe extension generally aligned with the rotational axis of the disc plate or rotor.

Thus, an object, advantage and feature of the invention is the utilization of a set of tools having the capacity to provide a means for measurement of the thickness of a brake pad lining attached to a caliper in an opposed relationship to a brake disc rotor while the wheel assembly remains fixed to the vehicle thereby avoiding the necessity to remove the wheel assembly from the vehicle.

A further object, advantage and feature of the invention is to provide a set of gauge tools, each tool having a unique, individual thickness measurement gauge thereby enabling a mechanic or auto repair provider to match the thickness of a brake pad lining with a gauge tool from the set and thereby evaluate the thickness of a brake pad lining with high certainty.

Another object, advantage and feature of the invention is to provide a brake pad lining measurement tool which may be used by positioning the tool in a radial direction with respect to the rotor or disc axis of the disc brake as well as parallel to the rotor axis.

Yet another object, advantage and feature of the invention is to provide a set of tools as described which is easy to use, inexpensive and enables a vehicle mechanic to easily and confidently evaluate the thickness of a brake pad lining, particularly a brake pad of a disc brake assembly.

These and other objects, advantages and features of the invention will be set forth in a detailed description which follows.

BRIEF DESCRIPTION OF THE DRAWING

In the detailed description which follows, reference will be made to the drawing comprised of the following figures:

FIG. 1 is a plan view of an embodiment of a typical measurement gauge made in accord with the invention;

FIG. 2 is an end view of the gauge of FIG. 1 as viewed from the right end of FIG. 1;

FIG. 3 is an opposite, left end view of the gauge of FIG. 1;

FIG. 4 is a plan view of an alternative size of a gauge of the invention;

FIG. 5 is a plan view of a further alternative gauge size;

FIG. 5A is a partial perspective view of the gauge measurement section of FIG. 5;

FIG. 6 is a top view of a series of gauges of the type which practice the invention connected by means of a flexible chain to thereby provide a set of gauges, each having its own unique gauge measurement ability;

DESCRIPTION OF EMBODIMENTS OF THE INVENTION

Figure 8:
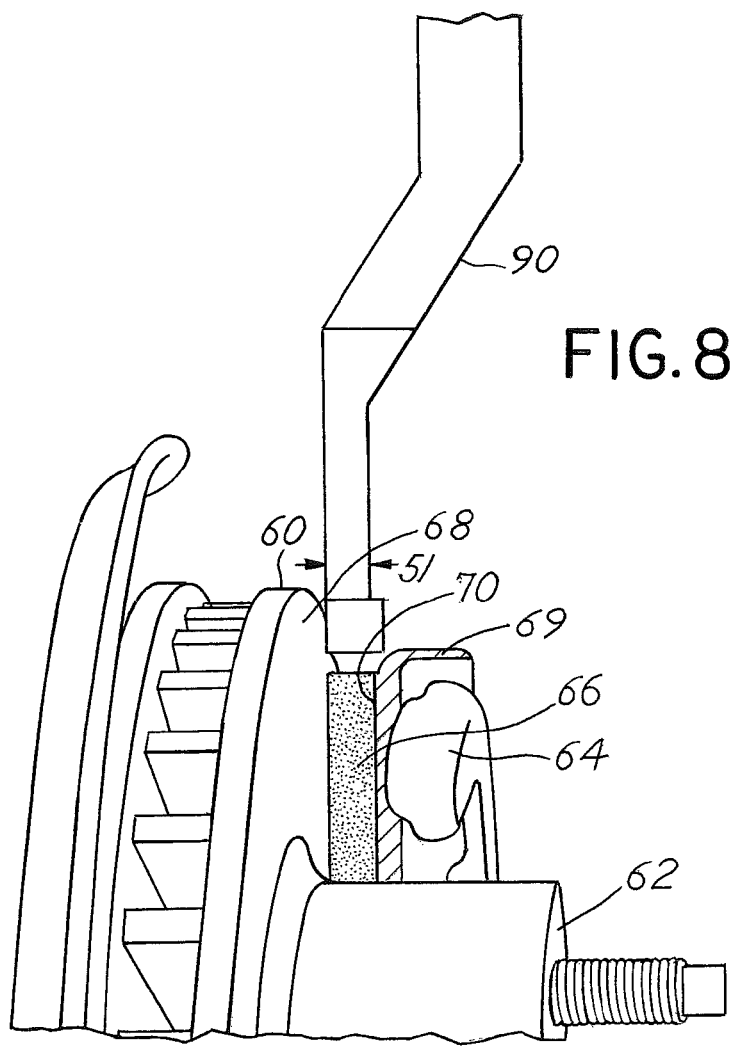
FIG. 8 is a perspective view of the gauge of FIG. 7 depicted in a radial position relative to the rotor axis of the disc brake assembly.

Referring to FIGS. 1, 4 and 5 there is depicted in a plan view examples of distinct measurement gauge embodiments or tools. The gauges in the figures are substantially identical except for the construction associated with the measurement section of the tool. That is, referring to the figures, each tool includes a handle section 20 connected to an intermediate section 22 which, in turn, is connected to an extension probe 24. The extension probe 24 terminates with a gauge measurement section 26.

The general profile of each of the tools is substantially the same or similar. That is, the handle section 20 and the remaining sections of the tool are made as a single, generally formed or molded plate or structure. The handle section 20 comprises a generally rectangular parallelepiped section with an opening, such as opening 32, for receipt of a flexible connection 34 such as a chain as depicted in FIG. 6. FIG. 6 depicts a collection of the separate tools, each tool having its own unique gauge measurement dimension. The handle section may be formed with a grip to facilitate ease of use.

The tools or a section, such as the handle section 20, may be color coded to indicate a thickness measurement. For example, tools which may be associated with thicker pad lining measurements may be green to indicate a safe or satisfactory thickness. Tools with a yellow code may indicate that caution may be required and red may indicate replacement of the pad. Thus, there may be a correlation between the color of the tool or a part of the tool and the general measurement indication that the tool will provide to a mechanic or service person.

The tools and, in particular, the gauge measurement section 26 may comprise an L-shaped configuration as depicted in FIG. 5A. A longitudinal extension or leg 40 of the L-shaped portion is joined to a second, transverse leg 42. The distal transverse end surface 44 of the second leg exhibits or provides a gauge first dimension 48. Gauge dimension 48 is equal to the longitudinal surface second gauge dimension 50 which spans the lateral surface 52 of the second leg 42 parallel generally to longitudinal axis 39.

Other features of the tool include the intermediate section 22 which forms an angle with respect to the handle section 20 to facilitate ease of positioning of the extension probe 24 tool. The extension probe 24 extends in the direction of the longitudinal axis 39 and is generally in the form of a rectangular parallelepiped such as a cube. The extension probe 24 has a length which is approximately equal to half of the length of the longitudinal axis dimension of the handle 20 and intermediate section 22 combined.

Each of the tools will thus include its own unique dimension 48 associated with the terminal end 44 and dimension 50 associated with side surface 52. Dimensions 48 and 50 are typically equal with respect to each gauge depicted in the various figures. Table 1 sets forth dimensions 48, 50 respectively of terminal end surface 44 and side surface 52 of a series of the tools or gauges such as depicted in FIG. 6. It is noted that in the event the thickness of the measurement section is too thin, accommodation for purposes of strength of the gauge may be provided as set forth for gauge 901 in the table. That is, the transverse dimension may be maintained.

TABLE 1

| Gauge | Axial Dimension (mm) (50) (Second Lateral Side Surface) | Transverse Dimension (mm) (48) (First Terminal End Surface) |
|---|---|---|
| 90A | 2 | 2 |
| 90B | 3 | 3 |
| 90C | 4 | 4 |
| 90D | 5 | 5 |
| 90E | 6 | 6 |
| 90F | 8 | 8 |
| 90G | 10 | 10 |
| 90H | 12 | 12 |
| 90I | 1.5 | 2 |

Figure 7:
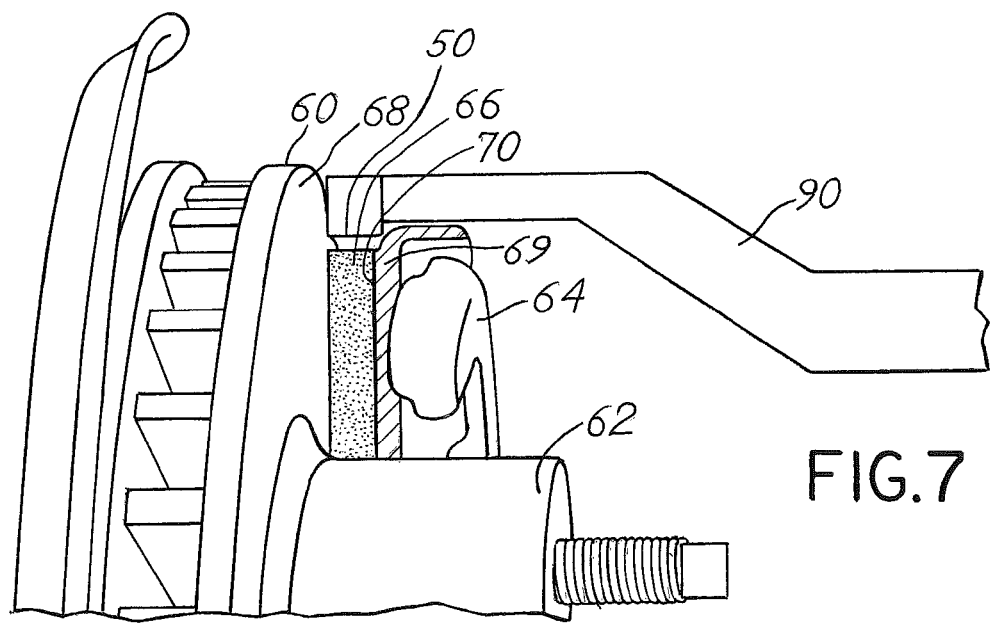
FIG. 7 is a perspective view of a gauge which is depicted in position generally in parallel with the rotor axis of a disc brake assembly.

FIGS. 7 and 8 illustrate the use of the set of tools of FIG. 6. Referring to those figures, a disc brake assembly includes a disc or rotor 60 mounted on a shaft 62. A caliper mount 64 has a pad 66 affixed thereto. An object of the invention is to measure the thickness of the pad lining 66 as it is retained within the depicted brake assembly. Thus, the pad lining 66 will have a thickness that is defined as the distance intermediate the face 68 of the disc 60 and the inside face 70 of the pad backing plate 69. To determine this thickness, a mechanic will select what he or she believes is the appropriate gauge tool and attempt to position the L-shaped leg assembly or block intermediate the disc face 68 and the pad backing plate 69.

FIG. 8 illustrates the circumstance wherein a tool of the same design, i.e. dimension size measurement, may be utilized by positioning it radially with respect to the shaft 62 or shaft axis 62. Thus, a tool 90 in FIG. 8 may be positioned so that the distal end surface 44 of the second leg may be inserted between the disc face 68 and the caliper face 66. In this manner, the gauge dimension 48 is matched with the thickness of the pad lining 66 thereby providing an alternative way of utilizing the tool in order to determine pad lining 66 thickness.

Referring to FIG. 7, the tool 90 is aligned coaxially with the rotational shaft 62 of the disc brake assembly. The tool 90 may be inserted through the spokes of a wheel or a hub so that the gauge section 26 is positioned as depicted with the surface 52 having the length dimension 50 extending between the face 68 of the disc and the face 70 of the pad backing plate 69 which are separated by the pad lining 66. In this manner, the thickness of the pad lining 66 can be measured by matching an appropriate tool, such as tool 90, having a gauge dimension 50 with the thickness of the pad lining.

In this regard, a series of such tools such as set forth in FIG. 6 will employ a series of dimensions associated with the gauge surfaces 48, 50. Matching of the appropriate gauge with the pad lining thickness then can be accomplished by radial positioning of the tool 90 as depicted in FIG. 8 or axial positioning of the tool 90 as depicted in FIG. 7.

Various modifications can be made to the assembly of the sets of the tools. As shown in FIG. 6, multiple tools of different gauge sizes are maintained on a chain or other linkage so that they will be easy to find and can be organized according to size for use to measure pad thickness. Additionally, the first and second leg may form a T-shape rather than an L-shape. The distal end side of a T-shape would be equivalent to the surface 52 of FIG. 5A and the lateral side end of the second leg would be equivalent to the surface 50 of FIG. 5A.

The gauge measurement section may comprise a cube, in which event, the dimensions 48 and 49 would be equal and the gauge measurement section 26 could be rotated for use as depicted in FIG. 8. Alternatively, the gauge measurement section may include distinct dimensions 48, 49 which are keyed to markings or indicate on the handle thereby providing two readings of the thickness of a pad lining measured in accord with the protocol depicted in FIG. 8. Also, the gauge measurement section 26 typically has a transverse dimension 48 greater than the transverse dimension or thickness 51 of probe extension 24 in order to provide a lip or ledge 53. Lip 53 facilitates positioning gauge measurement section 26 intermediate pad backing plate 69 and disc 60.

Additionally, all of the elements are depicted as being generally rectangular and a perpendicular relationship between the legs 40, 42. However, there is a range of tolerance whereby the elements comprising the legs may be angled one with respect to the other in order to provide the standardized length dimensions 48, 50 of sides of measurement surfaces 48, 52. Also, the probe extension 24 may be in the form of a rod or have other alternative cross sectional configurations. Thus, while there has been set forth an embodiment of the invention, it is to be understood that the invention is limited only by the following claims and equivalents.

What is claimed is:

1. A tool for measurement of the thickness of a brake pad lining of a disc brake assembly, said tool comprising:
an elongate tool article including a manual grip handle section at one end and a gauge measurement section at the opposite end, said gauge measurement section longitudinally spaced from the grip handle section by a probe extension from the grip handle section in the direction of a longitudinal axis between said grip handle section and said gauge measurement section;
said gauge measurement section including a first elongate leg extending longitudinally in the direction from the probe extension and a second leg extending transversely to the first leg;
said second leg having a first terminal end surface transverse to the longitudinal axis and connected to a second lateral side surface generally parallel to said longitudinal axis;
said first terminal end surface and said second lateral side surface of said second leg having an equal length dimension, whereby the handle section may be manipulated to position the first terminal end surface or the second lateral side surface of the gauge measurement tool intermediate a brake disc and brake pad caliper mount of a disc brake assembly and thereby measure the thickness of the brake pad therebetween.

2. A set of tools as set forth in claim 1, each tool comprised of a pair of unique, equal length dimensions.

3. The tool of claim 1 wherein the second leg is a rectangular parallelepiped.

4. The tool of claim 3 wherein the gauge measurement section is a cube.

5. The tool of claim 3 wherein the probe extension has a cross sectional shape of less area than a side of said gauge measurement section.

6. A tool for measurement of the thickness of a brake pad lining of a disc brake assembly, said tool comprising:
an elongate tool article including a manual grip handle section at one end and a gauge measurement section at the opposite end, said gauge measurement section longitudinally spaced from the grip handle section by a probe extension from the grip handle section in the direction of a longitudinal axis between said grip handle section and said gauge measurement section;
said gauge measurement section including a rectangular parallelepiped including a first dimension side extending longitudinally in the axial direction from the probe extension and a dimension side extending transversely to the first side;
said first side and said second side having an equal length dimension, whereby the handle section may be manipulated to position the first side dimension side of the gauge measurement section intermediate a brake disc having an axis and brake pad caliper mount of a disc brake assembly coaxially with said disc axis to measure the thickness of the brake pad lining therebetween or the second side dimension of the gauge measurement section transversely to a said disc axis intermediate a said disc brake and a said pad backing plate to measure the thickness of the brake pad lining therebetween.

7. The tool of claim 6 wherein the gauge measurement section is a cube.

* * * * *